US010179257B2

(12) United States Patent
Hsu

(10) Patent No.: US 10,179,257 B2
(45) Date of Patent: Jan. 15, 2019

(54) LINKAGE STRUCTURE OF RELUCTANCE UNIT AND BRAKE UNIT AND EXERCISE MACHINE HAVING LINKAGE STRUCTURE

(71) Applicant: GREAT FITNESS INDUSTRIAL CO., LTD., Tainan (TW)

(72) Inventor: Chih-Yung Hsu, Tainan (TW)

(73) Assignee: Great Fitness Industrial Co., Ltd., Tainan (TW)

( * ) Notice: Subject to any disclaimer, the term of this patent is extended or adjusted under 35 U.S.C. 154(b) by 16 days.

(21) Appl. No.: 15/453,066

(22) Filed: Mar. 8, 2017

(65) Prior Publication Data
US 2018/0259016 A1 Sep. 13, 2018

(51) Int. Cl.
| | |
|---|---|
| *A63B 21/012* | (2006.01) |
| *A63B 21/22* | (2006.01) |
| *A63B 22/06* | (2006.01) |
| *A63B 21/00* | (2006.01) |
| *F16D 63/00* | (2006.01) |
| *A63B 21/005* | (2006.01) |
| *A63B 21/015* | (2006.01) |

(52) U.S. Cl.
CPC ...... *A63B 21/012* (2013.01); *A63B 21/00072* (2013.01); *A63B 21/22* (2013.01); *A63B 22/0605* (2013.01); *A63B 21/005* (2013.01); *A63B 21/0051* (2013.01); *A63B 21/00058* (2013.01); *A63B 21/00076* (2013.01); *A63B 21/015* (2013.01); *A63B 22/06* (2013.01); *F16D 63/004* (2013.01)

(58) Field of Classification Search
CPC ........ A63B 21/00058; A63B 21/00072; A63B 21/00076; A63B 21/005; A63B 21/0051; A63B 21/012; A63B 21/015; A63B 21/22; A63B 22/06; A63B 22/0605; F16D 63/004
USPC .............................. 188/267, 106 P, 156, 164
See application file for complete search history.

(56) References Cited

U.S. PATENT DOCUMENTS

| | | | |
|---|---|---|---|
| 9,839,810 B1* | 12/2017 | Tzeng | A63B 21/00072 |
| 2010/0234185 A1* | 9/2010 | Watt | A63B 21/0051 482/8 |
| 2016/0263417 A1* | 9/2016 | Golesh | A63B 21/00069 |
| 2016/0310785 A1* | 10/2016 | Lo | A63B 21/005 |
| 2017/0036053 A1* | 2/2017 | Smith | A63B 21/015 |
| 2017/0239506 A1* | 8/2017 | Gibson | A63B 21/00072 |

* cited by examiner

*Primary Examiner* — Megan Anderson
(74) *Attorney, Agent, or Firm* — Rosenberg, Klein & Lee

(57) ABSTRACT

A linkage structure of a reluctance unit and a brake unit and an exercise machine having the linkage structure are provided. The exercise machine includes a main body, having a resistance wheel and a control unit; a linkage member, connected with the control unit; a reluctance unit, corresponding to the resistance wheel and connected with the linkage member; and a brake unit, corresponding to the resistance wheel and connected with the linkage member. The control unit controls the motion of the linkage member so that the linkage member drives the reluctance unit to move between a reluctance position and a release position, and the linkage member drives the brake unit to move between a brake release position and a brake position.

6 Claims, 7 Drawing Sheets

LINKAGE STRUCTURE OF RELUCTANCE UNIT AND BRAKE UNIT AND EXERCISE MACHINE HAVING LINKAGE STRUCTURE

FIELD OF THE INVENTION

The present invention relates to a linkage structure of a reluctance unit and a brake unit and an exercise machine having the linkage structure, and more particularly to an exercise machine capable of relieving reluctance and braking synchronously.

BACKGROUND OF THE INVENTION

A traditional reluctance-type exercise machine is disclosed as Taiwan Patent No. M374886 titled "brake adjustment mechanism and reluctance device of exercise bike". The reluctance control mechanism and the brake mechanism of the exercise bike are controlled separately. That is, the user can adjust the resistance of the resistance wheel according to his/her demand. After use, as the inertial force, the pedals will turn along with the resistance wheel. In order to facilitate the user to get off the exercise bike, it is required to operate the brake mechanism to stop rotation of the resistance wheel and the pedals.

However, when the resistance wheel is braked, the reluctance control mechanism remains at a specific reluctance position, which is inconvenient for the next user to adjust a desired reluctance position. Accordingly, the inventor of the present invention has devoted himself based on his many years of practical experiences to solve these problems.

SUMMARY OF THE INVENTION

In order to solve the problems of the prior art, the primary object of the present invention is to provide a linkage structure of a reluctance unit and a brake unit and an exercise machine having the linkage structure so that the reluctance unit and the brake unit can be operated synchronously. When the resistance wheel is braked, the reluctance unit can be moved away from the resistance wheel synchronously.

According to one aspect of the present invention, a linkage structure of a reluctance unit and a brake unit is provided. The linkage structure comprises a linkage member. The reluctance unit is connected with the linkage member. The brake unit is connected with the linkage member. When the linkage member is motioned, the reluctance unit is moved between a first position and a second position and the brake unit is moved between a third position and a fourth position.

Preferably, the linkage member is a rotary arm having a pivot center and a first arm and a second arm relative to the pivot center. The reluctance unit is fixed on the first arm. The brake unit is connected with the second arm. The rotary arm is pivoted about the pivot center so that the first arm drives the reluctance unit to move between the first position and the second position, and the second arm drives the brake unit to move between the third position and the fourth position.

Preferably, the brake unit includes a linkage plate and a brake shoe. The linkage plate has a first end and an opposing second end. The first end is pivotally connected to the second arm. The brake shoe includes an immovable pivot end and an opposing movable pivot end. The movable pivot end is pivotally connected to the second end. The second arm drives the linkage plate and then the linkage plate drives the brake shoe so that the brake shoe is moved between the third position and the fourth position.

Preferably, the linkage structure further comprises an elastic member. One end of the elastic member is fixed, and another end of the elastic member is connected to the second arm.

According to another aspect of the present invention, an exercise machine having a linkage structure of a reluctance unit and a brake unit is provided. The exercise machine comprises a main body, a linkage member, a reluctance unit, and a brake unit. The main body includes a resistance wheel and a control unit. The linkage member is connected with the control unit. The reluctance unit corresponds to the resistance wheel and is connected with the linkage member. The brake unit corresponds to the resistance wheel and is connected with the linkage member. The control unit controls a motion of the linkage member so that the linkage member drives the reluctance unit to move between a reluctance position and a release position, and the linkage member drives the brake unit to move between a brake release position and a brake position. When the reluctance unit is located at the reluctance position, the brake unit is located at the brake release position. When the reluctance unit is located at the release position, the brake unit is located at the brake position.

Preferably, the linkage member is a rotary arm having a pivot center and a first arm and a second arm relative to the pivot center. The reluctance unit is fixed on the first arm. The brake unit is connected with the second arm. The rotary arm is pivoted about the pivot center so that the first arm drives the reluctance unit to move between the reluctance position and the release position, and the second arm drives the brake unit to move between the brake release position and the brake position.

Preferably, the control unit includes an operating member and a control wire. One end of the control wire is connected to the operating member, and another end of the control wire is connected to the rotary arm. By operating the operating member, the control wire drives the rotary arm to pivot.

Preferably, the operating member includes a sleeve and an operating lever extending into the sleeve. The sleeve has a plurality of positioning holes arranged in a row. The operating lever has a positioning rod corresponding to the positioning holes. The control wire is fixed on the operating lever. When the operating lever is operated for the positioning rod to be engaged in one of the positioning holes, the control wire controls the position of the reluctance unit corresponding to the resistance wheel.

Preferably, the brake unit includes a linkage plate and a brake shoe. The linkage plate has a first end and an opposing second end. The first end is pivotally connected to the second arm. The brake shoe includes an immovable pivot end and an opposing movable pivot end. The immovable pivot end is pivotally connected to the main body. The movable pivot end is pivotally connected to the second end. The second arm drives the linkage plate and then the linkage plate drives the brake shoe so that the brake shoe is moved between the brake release position and the brake position.

Preferably, the exercise machine further comprises an elastic member. One end of the elastic member is fixed to the main body, and another end of the elastic member is connected to the second arm.

According to the foregoing technical features, the present invention can achieve the following effects:

The reluctance unit and the brake unit can be operated synchronously, such that the reluctance unit can be synchronously moved away from the resistance wheel while the resistance wheel is braked. This is convenient for next use.

DESCRIPTION OF THE PREFERRED EMBODIMENTS

Embodiments of the present invention will now be described, by way of example only, with reference to the accompanying drawings.

Figure 1:
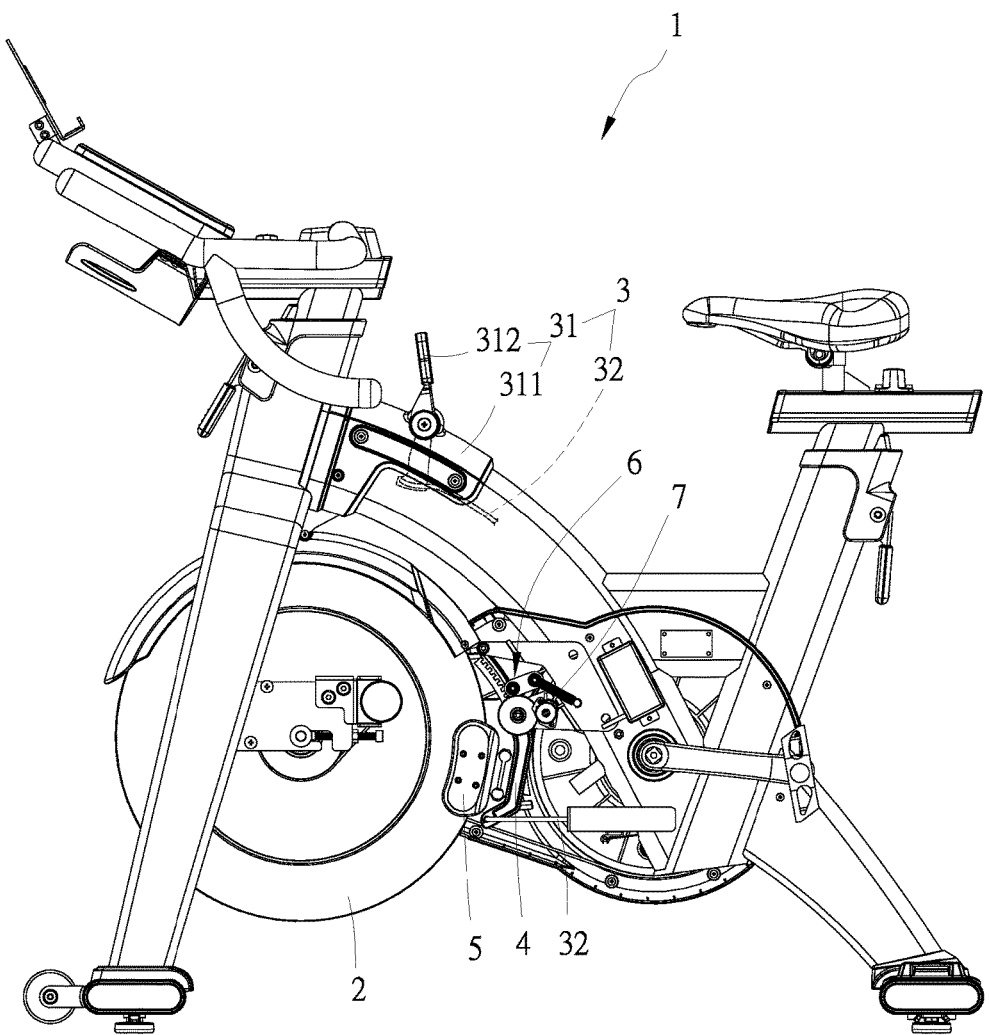
FIG. 1 is a structural schematic view of an exercise machine of the present invention.
Figure 2:
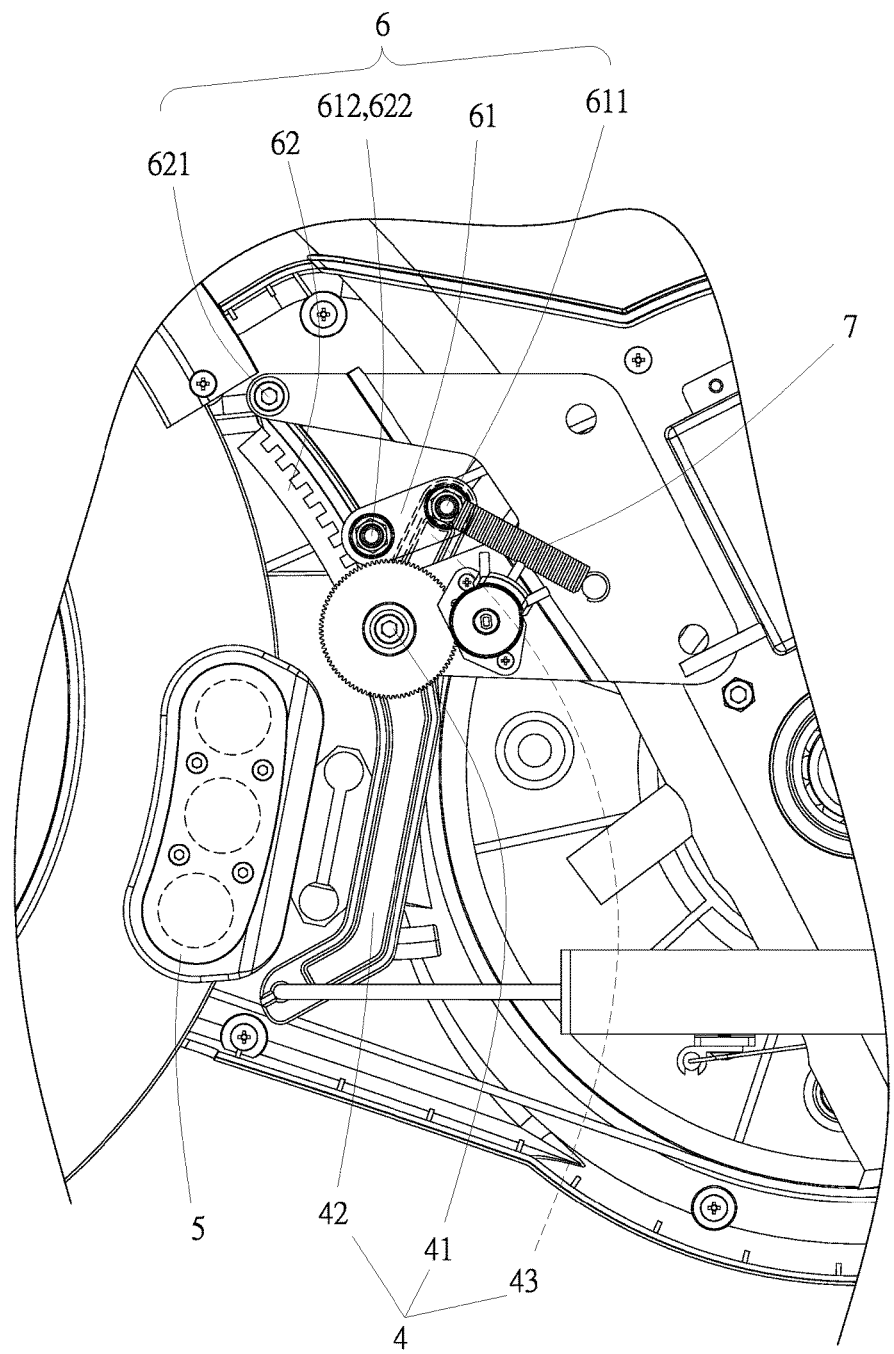
FIG. 2 is an enlarged view of a linkage structure of a reluctance unit and a brake unit of the exercise machine of the present invention.

The present invention discloses a linkage structure of a reluctance unit and a brake unit and an exercise machine having the linkage structure. As shown in FIG. 1 and FIG. 2, an exercise machine according to an embodiment of the present invention comprises a main body 1, a linkage member 4, a reluctance unit 5, a brake unit 6, and an elastic member 7. The main body 1 includes a resistance wheel 2 and a control unit 3. The linkage member 4 is connected with the control unit 3. The reluctance unit 5 corresponds to the resistance wheel 2 and is connected with the linkage member 4. The brake unit 6 corresponds to the resistance wheel 2 and is connected with the linkage member 4. One end of the elastic member 7 is fixed to the main body 1, and another end of the elastic member 7 is connected to the linkage member 4.

In this embodiment, the linkage member 4 is a rotary arm which has a pivot center 41 and a first arm 42 and a second arm 43 relative to the pivot center 41. The reluctance unit 5 is fixed on the first arm 42. The brake unit 6 is connected with the second arm 43. The brake unit 6 of this embodiment includes a linkage plate 61 and a brake shoe 62. The linkage plate 61 has a first end 611 and an opposing second end 612. The first end 611 is pivotally connected to the second arm 43. The brake shoe 62 includes an immovable pivot end 621 and an opposing movable pivot end 622. The immovable pivot end 621 is pivotally connected to the main body 1, and the movable pivot end 622 is pivotally connected to the second end 612. The elastic member 7 of this embodiment is connected with the second arm 43. The control unit 3 of this embodiment includes an operating member 31 and a control wire 32. The operating member 31 includes a sleeve 311 disposed on the main body 1 and an operating lever 312 extending into the sleeve 311. One end of the control wire 32 is connected to the operating lever 312, and another end of the control wire 32 is connected to the first arm 43.

Figure 3:
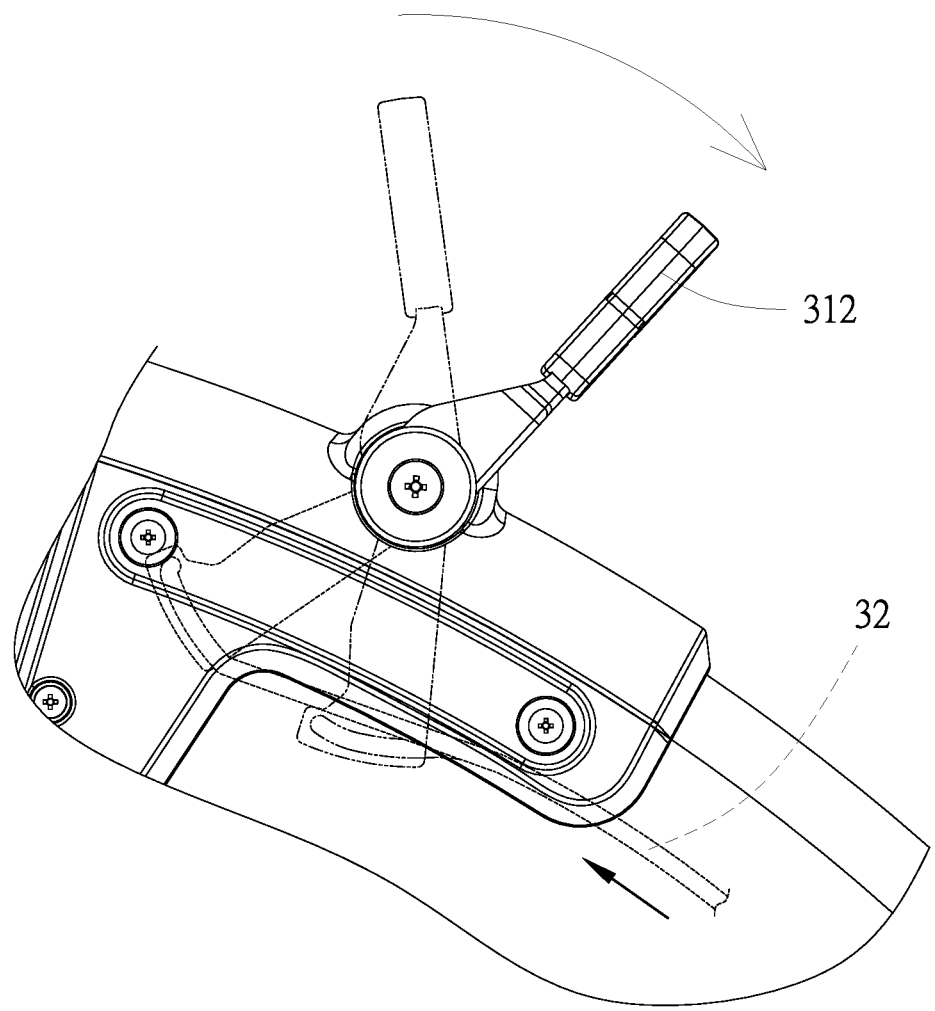
FIG. 3 is a schematic view showing the operation of a control unit for the linkage of the reluctance unit and the brake unit of the exercise machine of the present invention.
Figure 4:
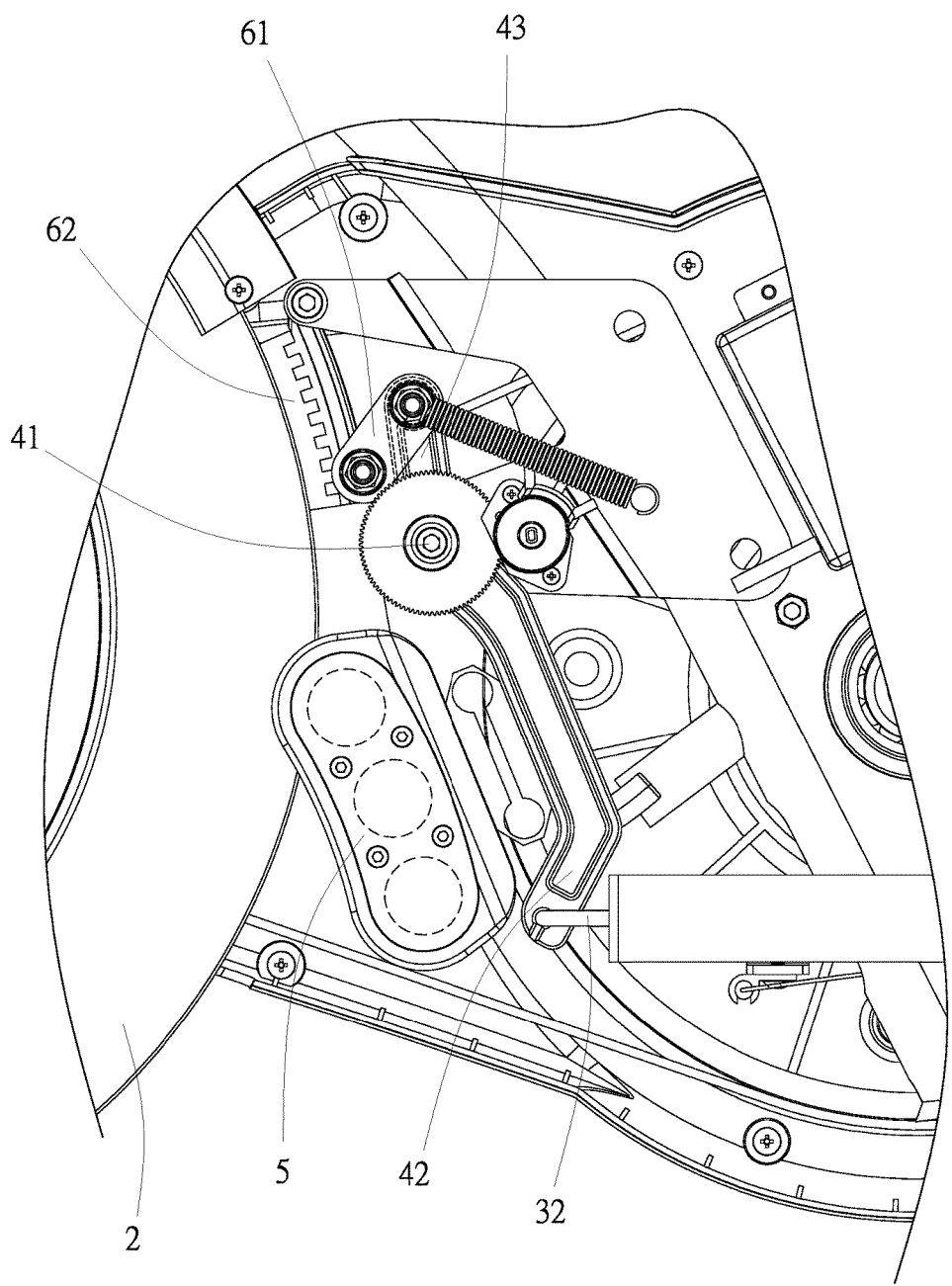
FIG. 4 is a schematic view showing the linkage of the reluctance unit and the brake unit by operating the control unit of the exercise machine in accordance with an embodiment of the present invention.

Referring to FIG. 3 and FIG. 4, the operating lever 312 is operated to pull the control wire 32, so that the first arm and 42 and the second arm 43 are pivoted relative to the pivot center 41. The first arm drives the reluctance unit 5 to move between a first position and a second position relative to the resistance wheel 2 (the first position is a reluctance position in which the reluctance unit 5 approaches the resistance wheel 2 for generating a resistance to the resistance wheel 2, as shown in FIG. 2; the second position is a release position in which the reluctance unit 5 is moved away from the resistance wheel 2 without generating a resistance to the resistance wheel 2, as shown in FIG. 4.) Meanwhile, the linkage plate 61 is driven by the second arm 43, and then the brake shoe 62 is driven by the linkage plate 61, so that the brake shoe 62 is moved between a third position and a fourth position (the third position is a brake release position in which the brake shoe 62 is moved away from the resistance wheel 2 without generating a braking action against the resistance wheel 2, as shown in FIG. 2; the fourth position is a brake position in which the brake shoe 62 approaches and gets contact with the resistance wheel 2, thereby generating a braking force to the resistance wheel 2, as shown in FIG. 4). Wherein, when the reluctance unit 5 is located at the reluctance position, the brake shoe 62 is located at the brake release position. When the reluctance unit 5 is located at the release position, the brake shoe 62 is located at the brake position.

When the user wants to stop using the exercise machine, the user may operate the operating lever 312 to move the reluctance unit 5 away from the resistance wheel 2 to reach the release position; meanwhile, the brake shoe 62 approaches and gets contact with the resistance wheel 2 to reach the brake position so as to stop the resistance wheel 2, providing a linkage effect of the reluctance unit 5 and the brake unit 6. This is convenient for the next user.

Figure 5:
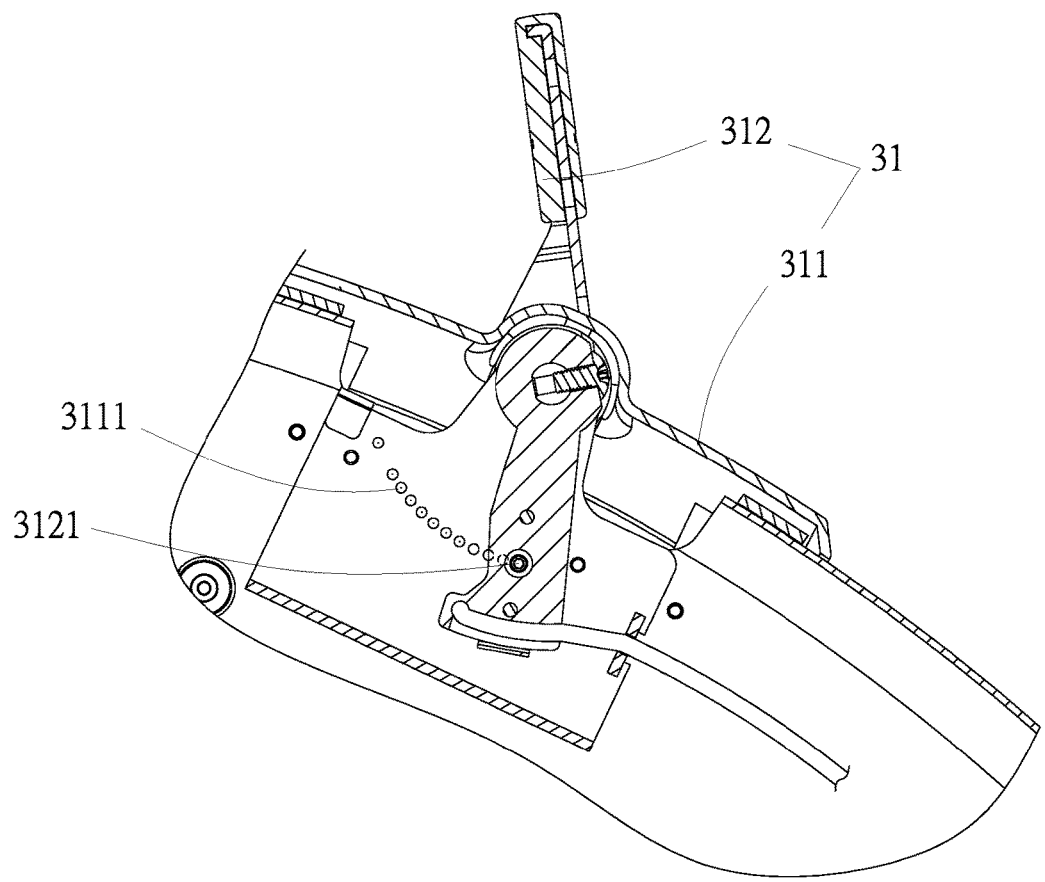
FIG. 5 is a structural schematic view showing the control unit of the exercise machine of the present invention.

Referring to FIG. 5, the sleeve 311 of the operating member 31 has a plurality of positioning holes 3111 arranged in a row. The operating lever 312 of the operating member 31 has a positioning rod 3121 corresponding to the positioning holes 3111.

Figure 6:
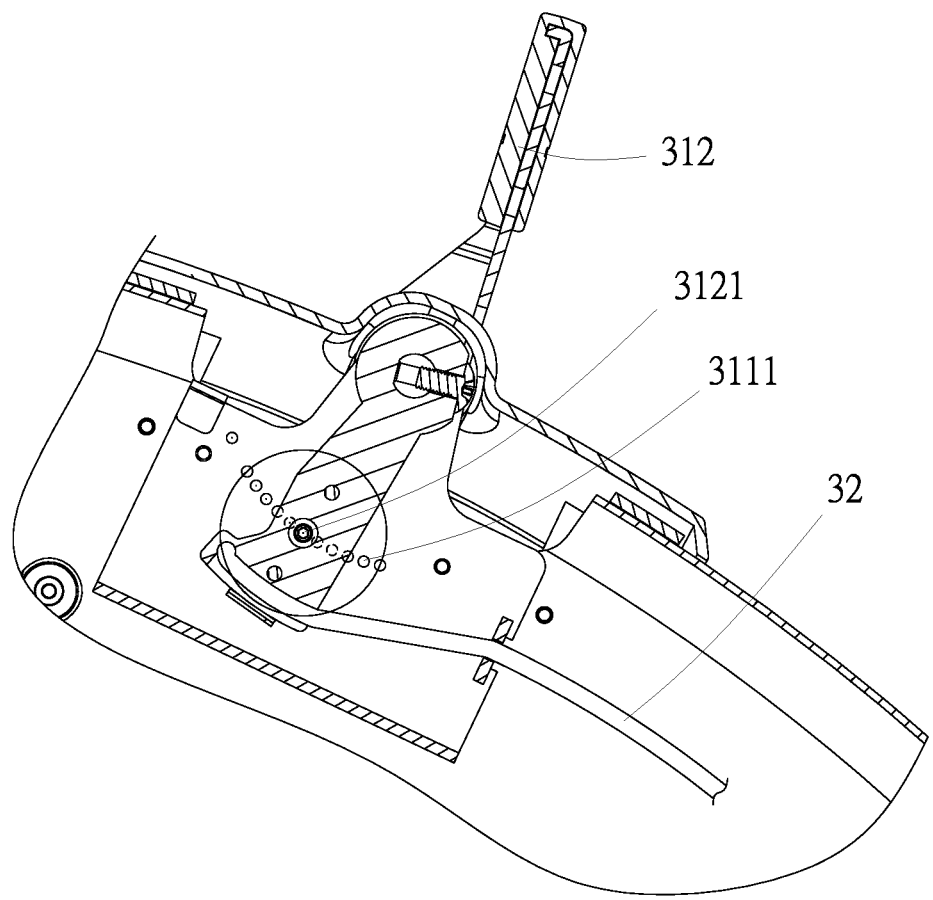
FIG. 6 is a schematic view showing the operation of the control unit for adjusting the reluctance of the reluctance unit in accordance with an embodiment of the present invention.
Figure 7:
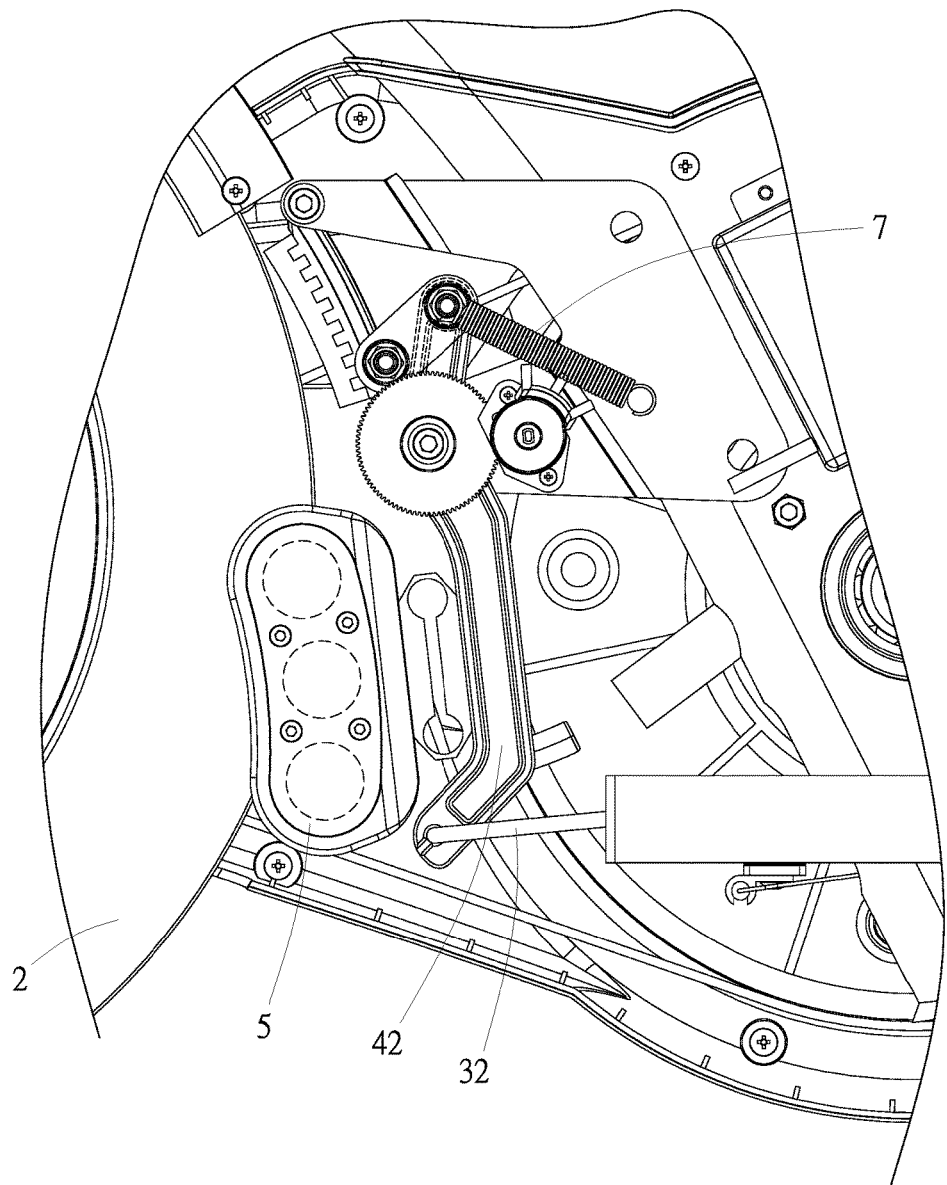
FIG. 7 is a schematic view of adjusting the reluctance of the reluctance unit by operating the control unit of the exercise machine in accordance with an embodiment of the present invention.

Referring to FIG. 6 and FIG. 7, when the user operates the operating lever 312 and aligns the positioning rod 3121 in one of the positioning holes 3111, the resistance applied to the resistance wheel 2 from the reluctance unit 5 is adjustable. For example, when the user operates the operating lever 312 for the control wire 32 to tighten the first arm 42, the reluctance unit 5 is relatively moved away from the resistance wheel 2 to reach the reluctance position in which the resistance applied to the resistance wheel 2 is less. At this time, the elastic member 7 is stretched to store an elastic potential energy and positioned by means of the engagement of the positioning rod 3121 and the positioning hole 3111. When the user operates the operating lever 312 for the positioning rod 3121 to be engaged in another one of the positioning holes 3111, the control wire 32 loosens the first arm 42 and the elastic member 7 releases the elastic potential energy to bring the reluctance unit 5 to approach the resistance wheel 2 and reach the reluctance position in which the resistance applied to the resistance wheel 2 is greater. Thereby, the user can adjust the required resistance.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An exercise machine having a linkage structure of a reluctance unit and a brake unit, comprising:
    a main body including a resistance wheel and a control unit;
    a linkage member connected with the control unit;
    the reluctance unit releasably attached to the resistance wheel and being connected with the linkage member;
    the brake unit releasably attached to the resistance wheel and being connected with the linkage member;
    wherein the control unit controls a motion of the linkage member so that the linkage member drives the reluctance unit to move between a reluctance position and a release position, and the linkage member drives the brake unit to move between a brake release position and a brake position; when the reluctance unit is located at the reluctance position, the brake unit is located at the brake release position; when the reluctance unit is located at the release position, the brake unit is located at the brake position.

2. The exercise machine as claimed in claim 1, wherein the linkage member is a rotary arm having a pivot center and a first arm and a second arm relative to the pivot center; the reluctance unit is fixed on the first arm; the brake unit is connected with the second arm; the rotary arm is pivoted about the pivot center so that the first arm drives the reluctance unit to move between the reluctance position and the release position, and the second arm drives the brake unit to move between the brake release position and the brake position.

3. The exercise machine as claimed in claim 2, wherein the control unit includes an operating member and a control wire, one end of the control wire is connected to the operating member, another end of the control wire is connected to the rotary arm, and by operating the operating member, the control wire drives the rotary arm to pivot.

4. The exercise machine as claimed in claim 3, wherein the operating member includes a sleeve and an operating lever extending into the sleeve, the sleeve has a plurality of positioning holes arranged in a row, the operating lever has a positioning rod corresponding to the positioning holes, the control wire is fixed on the operating lever; when the operating lever is operated for the positioning rod to be engaged in one of the positioning holes, the control wire controls the position of the reluctance unit corresponding to the resistance wheel.

5. The exercise machine as claimed in claim 2, wherein the brake unit includes a linkage plate and a brake shoe, the linkage plate has a first end and an opposing second end, the first end is pivotally connected to the second arm; the brake shoe includes an immovable pivot end and an opposing movable pivot end, the immovable pivot end is pivotally connected to the main body, the movable pivot end is pivotally connected to the second end; the second arm drives the linkage plate and then the linkage plate drives the brake shoe so that the brake shoe is moved between the brake release position and the brake position.

6. The exercise machine as claimed in claim 5, further comprising an elastic member, one end of the elastic member being fixed to the main body, another end of the elastic member being connected to the second arm.

* * * * *